United States Patent
Kaleta (10) Patent No.: US 12,543,762 B2
(45) Date of Patent: Feb. 10, 2026

(54) FREEZE DRIED WHOLE ANIMAL PET FOOD

(71) Applicant: IFS Companies, LLC, Fallbrook, CA (US)

(72) Inventor: Christian Kaleta, Chandler, AZ (US)

(\*) Notice: Subject to any disclaimer, the term of this patent is extended or adjusted under 35 U.S.C. 154(b) by 444 days.

(21) Appl. No.: 18/337,274

(22) Filed: Jun. 19, 2023

(65) Prior Publication Data

US 2024/0172776 A1     May 30, 2024

Related U.S. Application Data

(60) Provisional application No. 63/385,137, filed on Nov. 28, 2022.

(51) Int. Cl.
    *A23K 10/20*     (2016.01)
    *A23K 20/174*     (2016.01)
    *A23K 50/00*     (2016.01)

(52) U.S. Cl.
    CPC ............ *A23K 10/20* (2016.05); *A23K 20/174* (2016.05); *A23K 50/00* (2016.05)

(58) Field of Classification Search
    CPC ...... A23K 10/20; A23K 20/174; A23K 50/00; A23K 30/20; A23K 40/00
    See application file for complete search history.

(56) References Cited

FOREIGN PATENT DOCUMENTS

CN     109527205     3/2019

OTHER PUBLICATIONS (GVD20 Industrial Freeze Dryer, https://web.archive.org/web/20220519173532/https://girovac.com/product/gvd20-industrial-freeze-dryer/) (Year: 2022).*
(Babic et al., the effects of freeze-drying process parameters on Broiler chicken breast meat, PWT-Food Science and Technology 42 (2009) 1325-1334) (Year: 2009).*
Rolland O. Hower, The Freeze-Dry Preservation of Biological Specimens, Smithsonian Institution, Washington D.C. 1967.
Dorota Nowak et al. The Freeze-Drying of Foods—The Characteristic of the Process Course and the Effect of Its Parameters on the Physical Properties of Food Materials. Foods. Oct. 2020; 9(10): 1488. Published online Oct. 18, 2020. doi: 10.3390/foods9101488.
Qingdao daren fortune animal technology co.,ltd. Freeze-Dried Baby Mice. http://www.darenpetfoods.com/freeze-dried-baby-mice.html, Visited Jun. 19, 2023.
Tim Wall, Mar. 27, 2022, https://www.petfoodindustry.com/news-newsletters/pet-food-news/article/15468725/15-brands-new-freeze-dried-pet-foods-at-global-pet-expo. Visited Jun. 19, 2023.

\* cited by examiner

*Primary Examiner* — Emily M Le
*Assistant Examiner* — Carrie Glimm
(74) *Attorney, Agent, or Firm* — Mark Wisnosky (57) ABSTRACT

Process steps including control means and devices for producing freeze dried whole animal pet food are described. The process includes use of a perforating device to produce an array of circular holes with a particular configuration and a selected set of process steps and control parameters that produce the freeze dried whole animal. The freeze dried whole animal appears much the same as the original live animal(s), is safe to handle with no exposed viscera, is not discolored, and rehydrates quickly to 100% of the initial live animal weight.

4 Claims, 10 Drawing Sheets

PRIOR ART
Copyright©Qingdao Daren Fucheng
Animal Technology Co., Ltd.
FIGURE 1

FREEZE DRIED WHOLE ANIMAL PET FOOD

CROSS-REFERENCE TO RELATED APPLICATIONS

This application claims priority to U.S. Provisional Patent Application 63/385,137, FREEZE DRIED WHOLE ANIMAL PET FOOD, filed Nov. 28, 2022 and by the same inventor.

STATEMENT REGARDING FEDERALLY SPONSORED RESEARCH OR DEVELOPMENT

Not Applicable.

BACKGROUND OF THE INVENTION

Technical Field

The invention relates to a process for producing whole freeze dried animals used as food for reptile and other pets and the whole freeze dried animals produced by the process.

Related Background Art

Reptiles, such as nonvenomous snakes and lizards are popular pets. In the wild reptiles are generally omnivores and eat rodents, insects, and other small animals whole. Typically, their diet is 75% animal and 25% plant matter. Feeding more than 25% plant matter is known to be an unhealthy diet. It is recommended that reptiles diet includes whole prey regularly through their life span. Although feeding small pieces of meat and cut up pieces of whole animal is also beneficial, reptiles skeletal, muscular, and digestive systems are all naturally designed for eating at least some whole prey. Not feeding them as such causes their natural systems to adapt and in most cases atrophy. Typically, in the wild, reptiles prey first on the newborn young of rodents and other animals. Mice, grown commercially as food products are ideal. However live mice or other animal are not ideal. Live feed stock animals can be very aggressive and can injure a reptile in captivity. Live rodents can also carry disease that rodents raised as feedstock and otherwise processed might not. However even frozen prepared dead mice can present a health and odor risk if refrigeration is not maintained.

There is a need to be able to preserve through shipment and storage a variety of mouse, rat, and other feedstock animals. A preferred method would be freeze drying and then packaging the rodent feedstock as whole animals that can be reconstituted with water to its original form. This product has not, until this disclosure, been successfully produced. Bearded dragon diets, for example, should consist of low fat content and high calcium. Mice as they age past what people call the "fuzzy" stage or when they start to grow hair are considered too high in fat content. Pinky mice or newborn mice are much healthier for bearded dragons as they have less then 5% crude fat and a buildup of calcium on their stomachs which is what's required for a healthy bearded dragon diet. Similar requirements apply to other reptiles and non-reptiles from youth to adult that would have requirements for different variety and size of whole animals. There is a need to preserve mouse and other feed stock animals, whole, from the newborn, "pinky" phase of mouse to adults. There is a need the animal feedstock be in a physical form as to volume and weight that is unchanged from the live animal. There is a need the animal feedstock can be made economically with shortened freeze dried times. There is a need the animal feedstock can be shipped and stored without refrigeration or special handling. There is a need for an animal feedstock that is convenient for the end customer, typically a pet owner, pet store owner, or, zookeeper, to use. Reconstitution times must be short and the animal feedstock, both freeze dried and reconstituted must be substantially intact to avoid the user contacting viscera of the animal. The animal feedstock should look like the live animal and be able to be safely handled much as the original live animal. Safe handling includes not exposing the user to the viscera of the feedstock either as a freeze dried product or as the reconstituted pet food.

SUMMARY OF THE INVENTION

The invention addresses all the shortcomings of prior art through new processing techniques and controls. New processing techniques and controls include flash freezing of the animal after euthanizing the animal to avoid large crystal growth followed by a new perforation process to allow complete drying of the animal feedstock while not destroying the form of the animal and producing a freeze dried product that can be reconstituted to the original animal shape and weight. The outer skin or pelt of the reconstituted animal feedstock remains substantially intact for safe handling. The perforation process can optionally include means to simultaneously inject liquids into the animal feedstock carcass. The liquids could include preservative chemicals, pharmaceuticals, and nutritive solutions. Specific examples and data are presented for rodent, rat and mouse, feedstock at varying ages from newborn (pinky) to large adult. However, the techniques described herein are applicable to other animal feedstocks as well.

The specific examples are not intended to limit the inventive concept to the example application. Other aspects and advantages of the invention will be apparent from the accompanying drawings and detailed description.

DETAILED DESCRIPTION OF THE INVENTION

Figure 1:
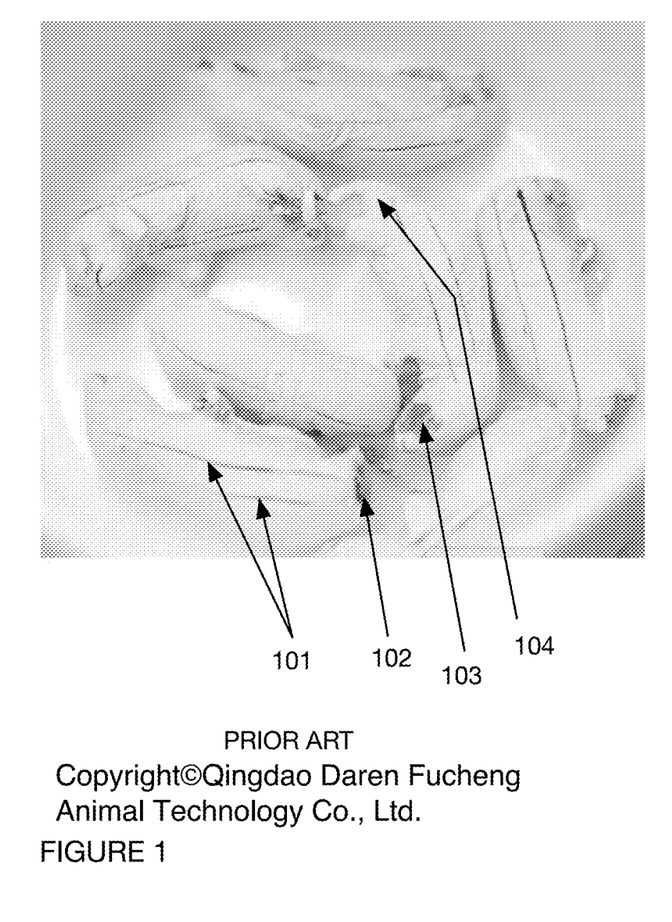
FIG. 1 shows a prior art freeze dried mouse seen at https://www.darenpetfoods.com/freeze-dried-baby-mice.html, visited 24 Nov. 2022.

FIG. 1 shows a prior art dehydrated pinky mouse as provided by Qingdao Daren Fucheng Animal Technology Co., Ltd. (See: https://www.darenpetfoods.com/freeze-dried-baby-mice.html, visited 24 Nov. 2022). Each mouse is seen to include body length slits 101 and in some case the anus and tail are removed 102 and in other cases the anus and tail are intact 104, but the lower jaw appears to be removed 103. This product does not meet the goals, discussed above, of an intact animal.

Figure 2:
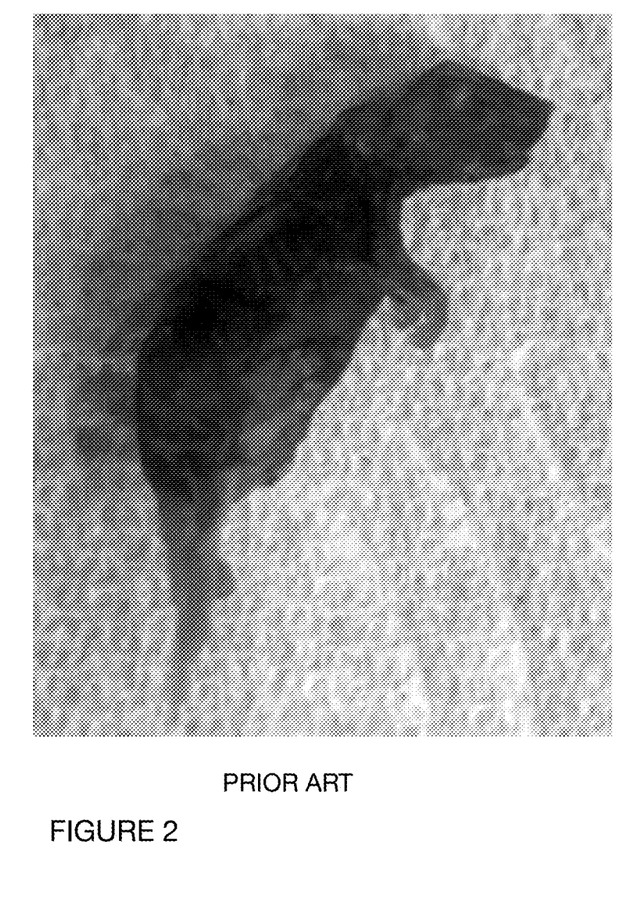
FIG. 2 shows a $2^{nd}$ example of a prior art freeze dried mouse.

FIG. 2 shows a first attempt at producing a freeze dried rodent. The specimen was prepared using default settings of a commercial freeze dry unit. The freeze dried animal is seen to be significantly discolored. The original color was as shown for all other specimens in FIGS. 1-7. The process used to prepare the specimen of FIG. 2 is: The rodent was euthanized and frozen, but not flash frozen, and was placed in the dehydration machine and dehydrated using the default program:

1) Cooling to −50 degrees Fahrenheit, using ice traps set to −60° F.
2) The chamber is evacuated to 10 mtorr.
3) Temperature was gradually (over 24 hours) raised to 20° F., while maintaining traps and vacuum.
4) A final drying cycle, to ensure low moisture, the rodent was then heated to 125° F. again while maintaining the vacuum.

The result is the rodent seen in FIG. 2. This blackened result is not acceptable.

All of the aforementioned temperatures/settings are the factory presets on a commercially available Harvest Right® freeze-drying machine (HARVEST RIGHT is a registered trademark of Harvest Right LLC, a Utah limited Liability Company).

Figure 7:
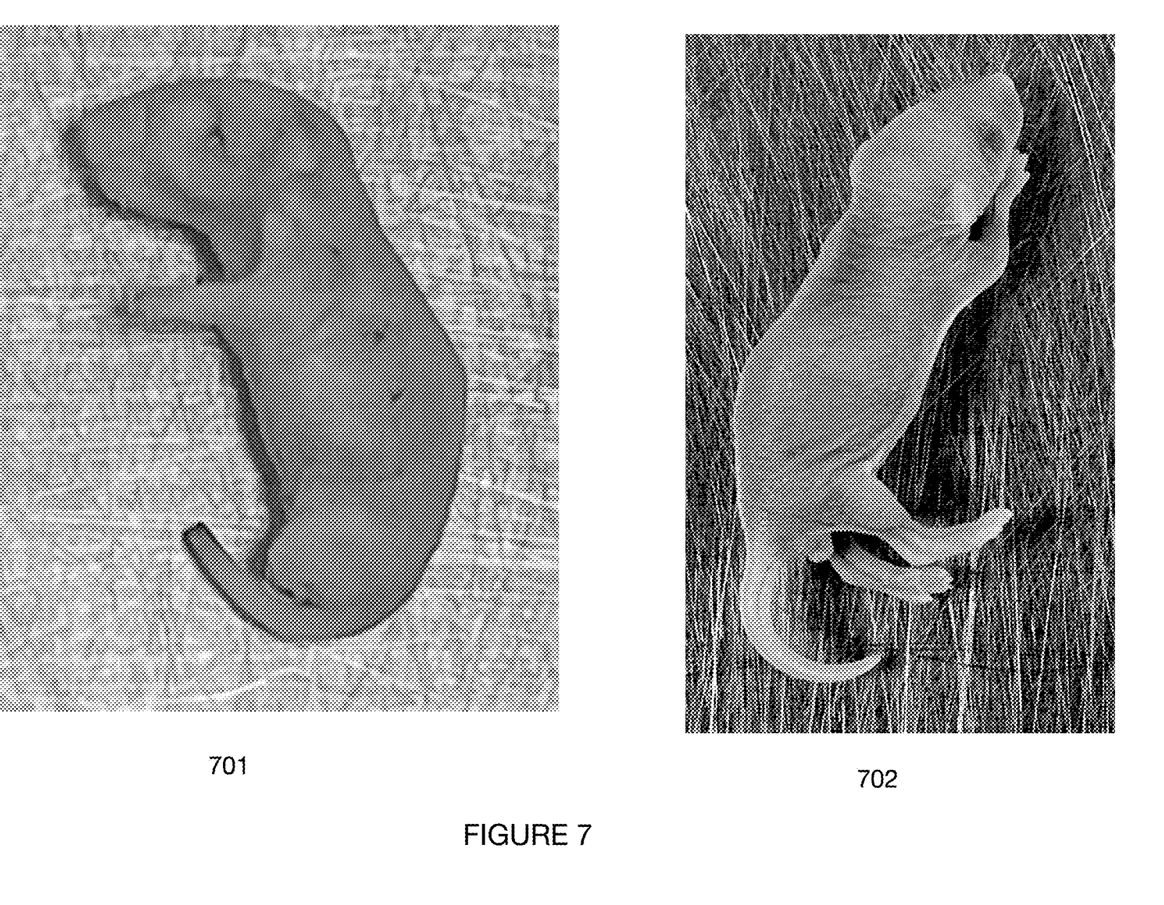
FIG. 7 shows side by side photos of a reconstituted freeze dried mouse according to the present invention alongside the live new-born mouse of FIG. 3.
Figure 8:
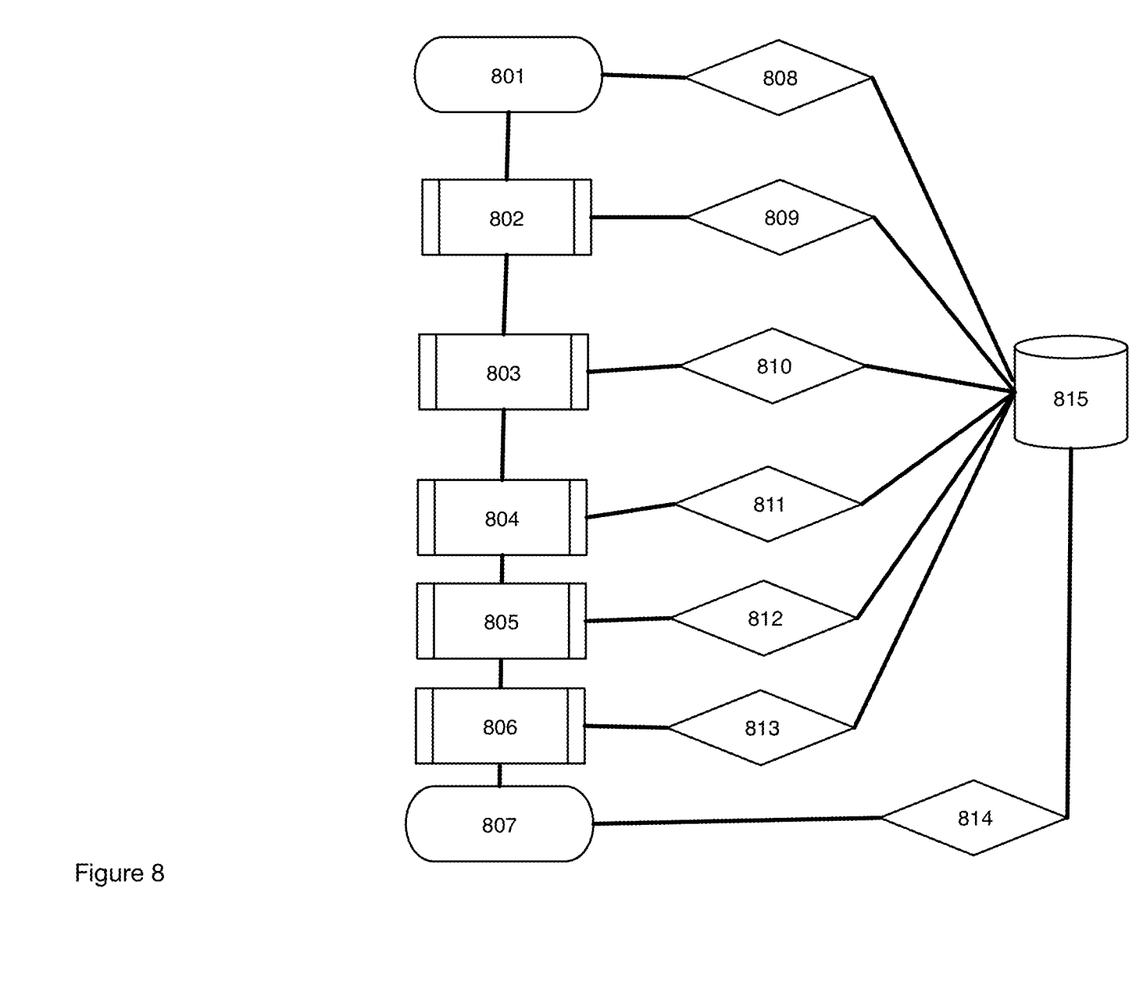
FIG. 8 shows flow chart for preferred freeze drying process.

The process that has produced the desired results is shown as a flow chart in FIG. 8 and the corresponding images of FIGS. 3-7.

Figure 3:
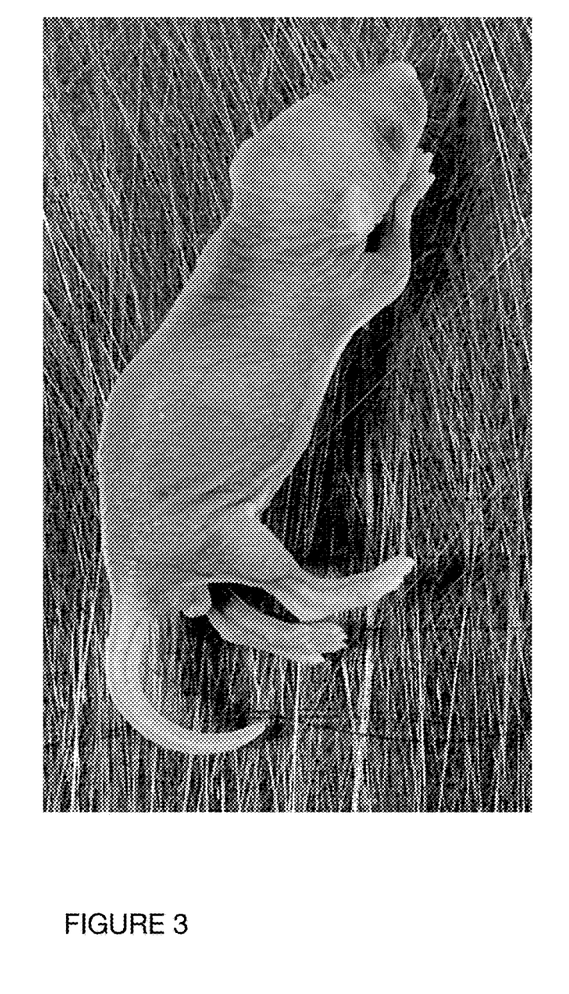
FIG. 3 shows a live new-born ("pinky") mouse.
Figure 4:
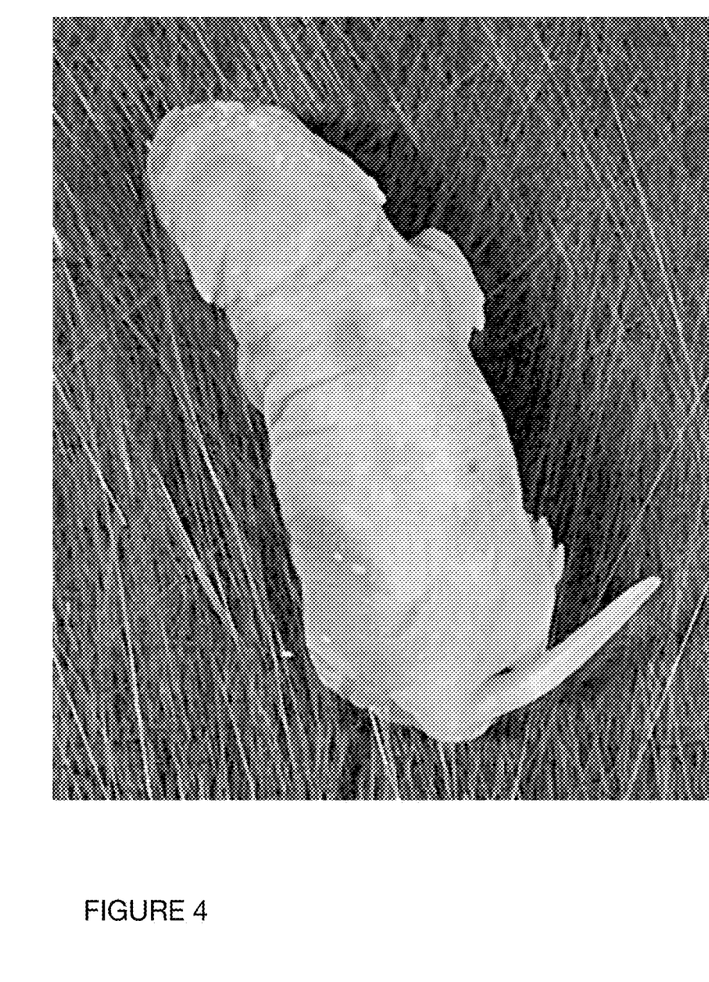
FIG. 4 shows a flash frozen new-born mouse according to the present invention.
Figure 5:
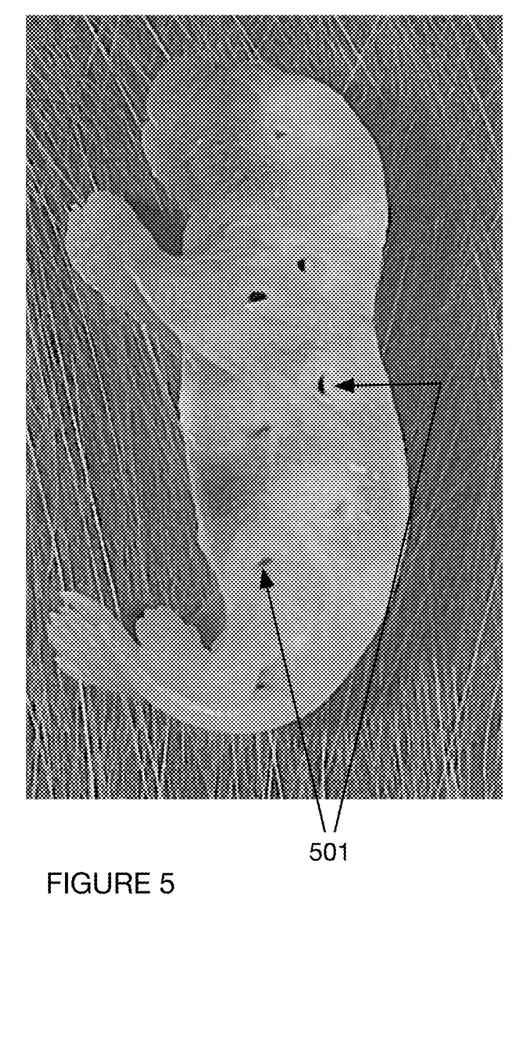
FIG. 5 shows a perforated, flash frozen, new-born mouse according to the present invention.
Figure 6:
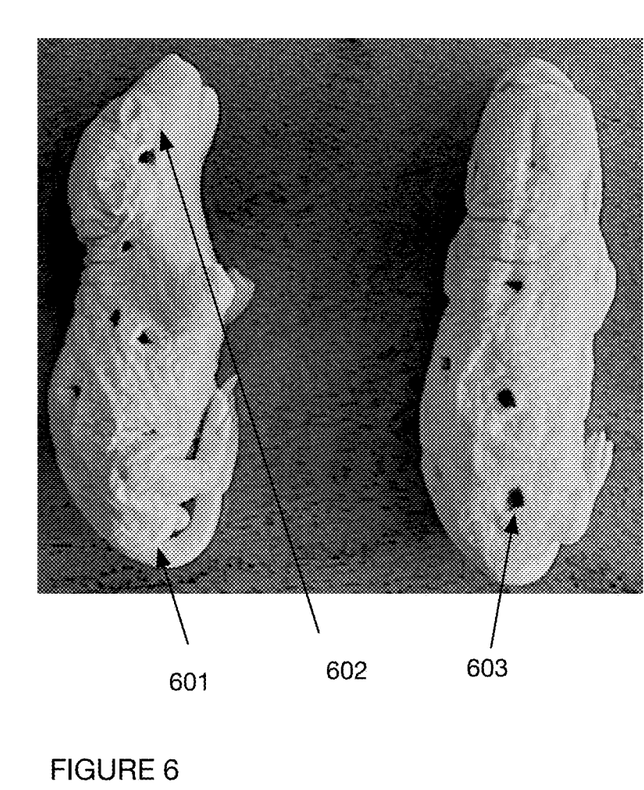
FIG. 6 shows a freeze dried mouse according to the present invention.

1) The rodent is euthanized 801, FIG. 3. The process is controlled 808 using stored parameters 815. In this instance control includes visual appearance, weight, etc. The stored parameters 815 includes limits for all parameters, including photographic visual standards such as FIG. 3 and other parameters including weight, size color. The control process 808 includes measures of the parameters and comparison with the pre-selected and stored limits 815. The same is true for all of the control steps 809-814 each includes stored parameters 815 and control means for each of the steps 801-807 respectively.
2) The rodent is flash-frozen to −15° F.*802, FIG. 4. The temperature of the flash freezing is controlled 809 based upon a preselected stored program 815. The control 809 includes controlling the time and temperature of the flash freezing according to stored parameters 815. In one version the control 809 optionally includes updating the process control points based upon observed results during the flash freeze process 802. The same is true of all the control steps 808-814.
3) The rodent is perforated 803 with small holes 501 per the images of FIGS. 5-6.
4) The rodent is placed in a freeze dryer, evacuated to approximately 10 mtorr and set to −10° F. for the first two weeks, with ice traps set at −60° F. 804.
5) The temperature is raised from −10° F. to 0° for weeks 3-4 805.
6) The temperature is raised from 0° to 10° for weeks 5-6 806. In the final form, the freeze dried rodent of FIG. 6, the tail 601 and head 602 are intact contrary to the result shown in the prior art of FIG. 1, and the perforation holes 603 are visible but do not expose the viscera of the rodent as in prior art (FIG. 1) example.
7) Rodent is packaged for shipping. Control 814 includes visual appearance FIG. 6 as well as a final moisture content of 5-6% (w/w). In a preferred process, the rodent is perforated with holes 501 to a depth of ¼" with a needle width of ¹⁄₁₆", spacing is at ¼" in grid format as shown and discussed below in FIGS. 11 and 12. The length of the process is cut in half (down to 3 weeks total) with these preferred perforations compared with the example shown and discussed above.

FIG. 7 shows side by side images of a rodent freeze dried according to steps 1-7 above and then reconstituted in water 701 compared to the original euthanized specimen 702. As seen the body of the specimen 701 is intact and compares with the original, not freeze dried, specimen 702.

Figure 9A:
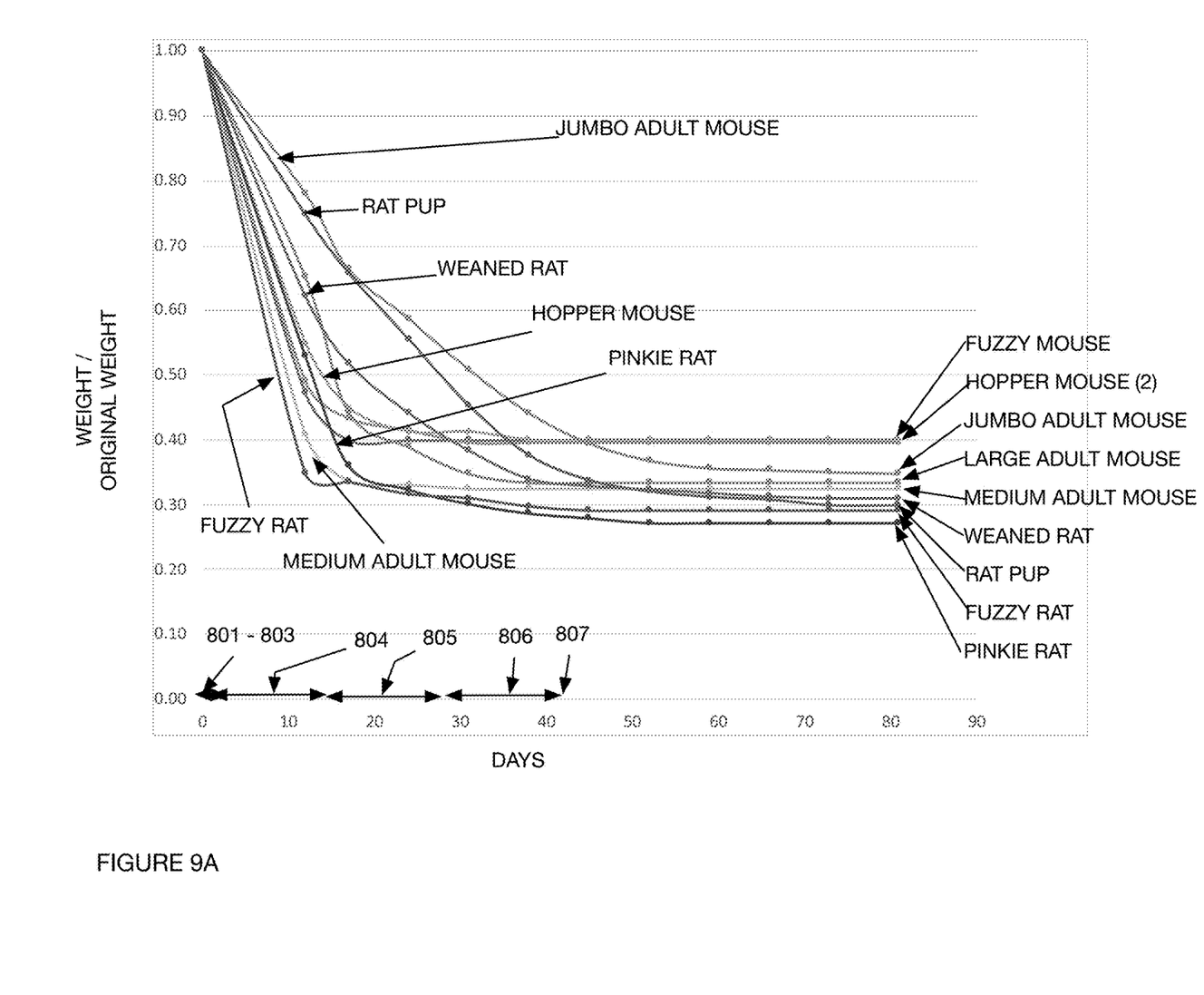
FIG. 9A shows lyophilization curves as controlled through the process of FIG. 8 for mice and rats at different ages and sizes.
Figure 9B:
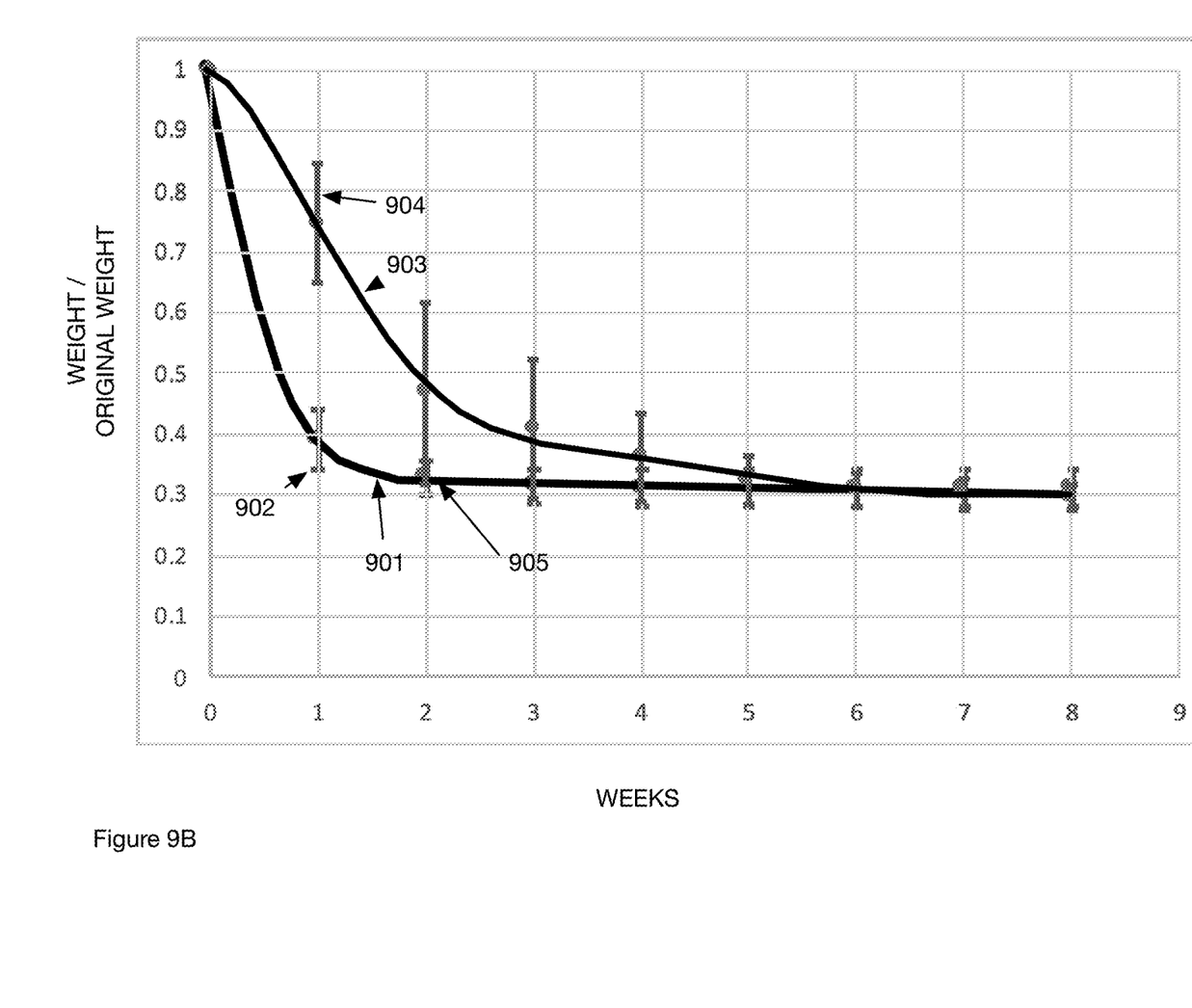
FIG. 9B shows lyophilization curves as controlled through the process of FIG. 8 and as compared to prior art for multiple samples.

FIG. 9A shows the lyophilization curves for a variety of type, size, and age of rodents as a fraction of the original weight (Y-axis) of the euthanized rodent over time (X-axis, time in Days) as they were processed through steps 1-7 described above. FIG. 9B shows lyophilization curves for multiple weaned rats made according to the present invention 901 compared with those made using prior art technique 903. These curves FIGS. 9A and 9B, are included in the parameters for the control steps 808-814 and stored 815. That is, during the process steps 801-807 the measured weights should lie on the shown curves for each rodent type. The time sequence and duration for each of the process steps 801-807 are shown along the x-axis. The curves of FIG. 9A are for example purposes. Actual curves used for control of the process depend upon other parameters such as the dehydrator used and therefore are selected for the manufacturing system. The smaller rodents are seen to reach a stable weight after 20 days or less. The stable weight also represents the ideal ~5% remaining moisture as required for shelf life after packaging and rapid reconstitution (see FIG. 10). The process, as described, and controlled in the enumerated steps according to FIG. 8, produces a very acceptable product and remedying the deficiencies of prior art as described above. A visual measure is as shown in FIG. 7 by comparison of the reconstituted specimen 701 with the original specimen 702. In one version such a visual measure is included in the final control step 814.

FIG. 9B shows lyophilization curves for replicate samples. The lower curve 901 is for samples prepared according to the invented process as described above. Error bars 902 for +/−1 standard deviation of the replicate samples are shown. It is seen samples prepared according to the invented process (curve 901) reach a stable dehydrated value after 2 weeks of lyophilization 905 and have a standard deviation 902 a factor of 10× less than the samples not prepared according to the invented process shown in the upper curves 903 with standard deviation 904. The invented process reduces the required dehydration time from 6 weeks to two weeks and produces a more consistent product, as indicated in the standard deviation, than the prior art sample.

Figure 10:
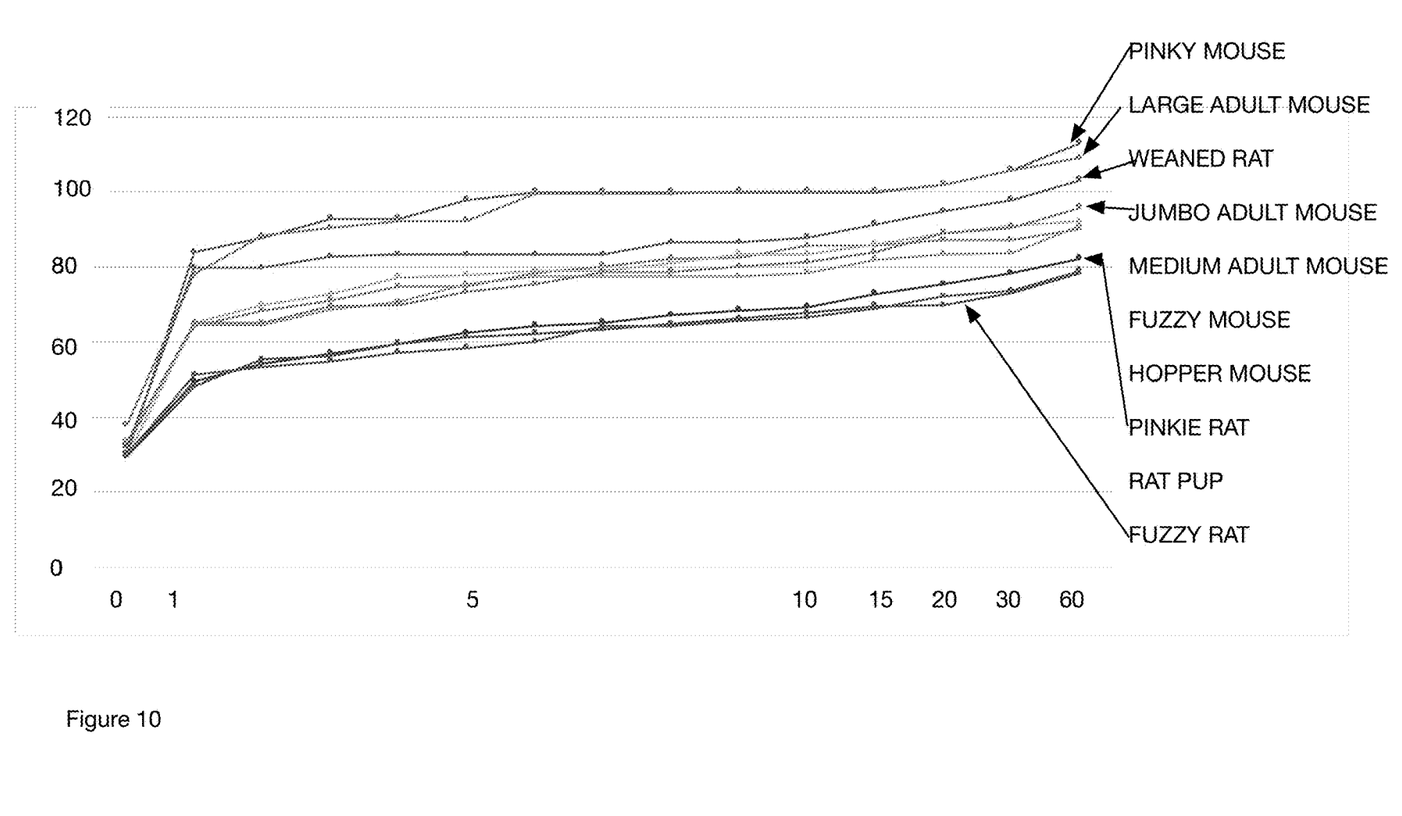
FIG. 10 shows rehydration curves for the specimens of FIG. 9.

FIG. 10 shows rehydration curves for a similar set of specimens as in FIG. 9. The X axis is rehydration time in minutes and the Y axis is the weight divided by the original weight. The curves show that for all specimen, the freeze dried weight was in the range of 30 to 40% of the original animal weight. The original live specimens were all about 60 to 70% water as would be expected and as known in the art. All the specimens rehydrated to 80 to 110% of their original weight. The rehydration curves are also examples of control parameters used for the process steps 801-807. That is if test specimen does not rehydrate according to curves such as shown in FIG. 10 then appropriate changes are made in parameters for any or all of the process steps such that the finished specimen rehydrates according to a pre-selected rehydration curve known to produce the desired end product.

Figure 11:
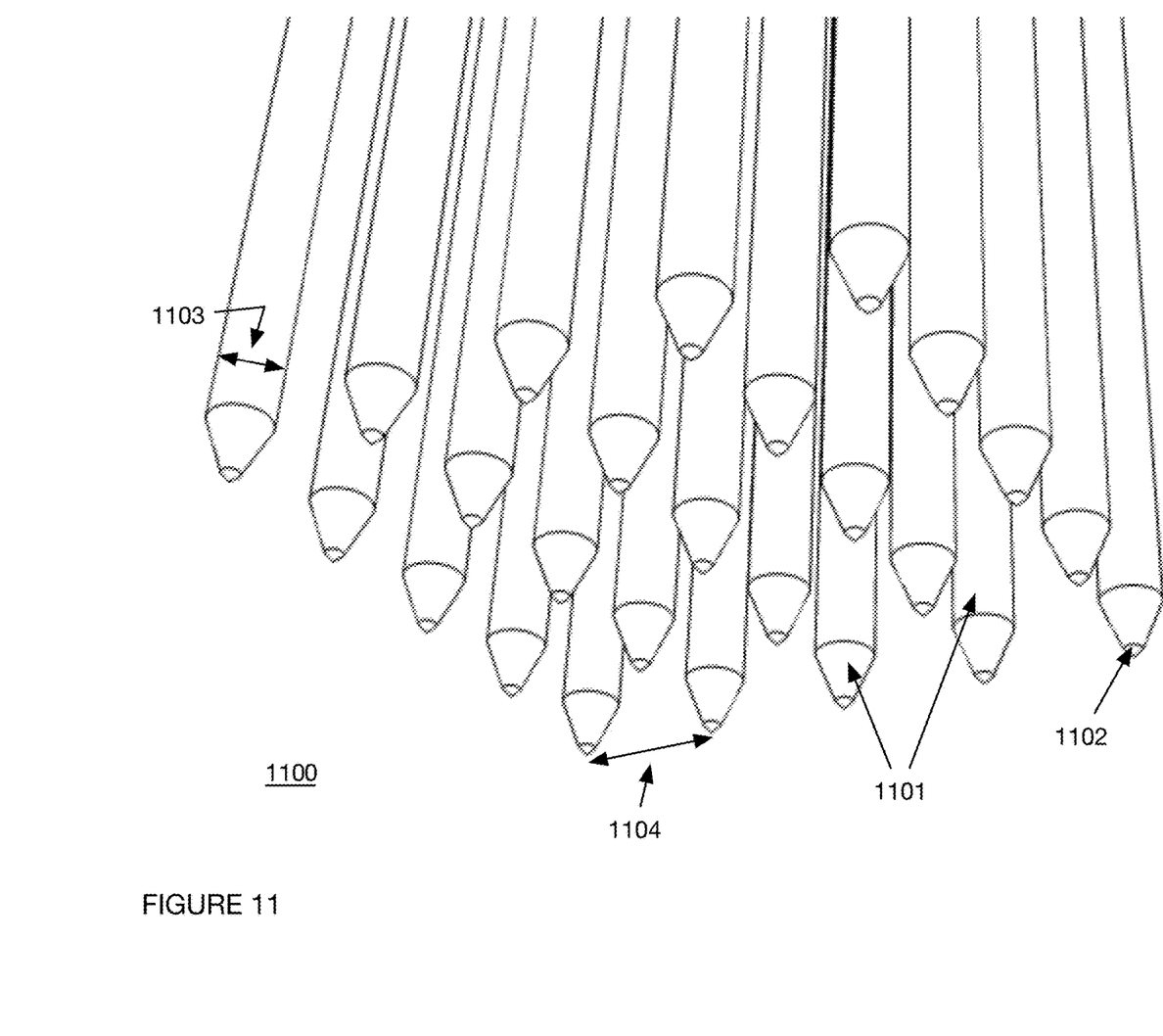
FIG. 11 shows a device that is used for perforation.

FIG. 11 shows a version of a device that is used to produce the perforations. The device 1100 is comprised of an array of needles or needle-like structures 1101 each with a sharpened tip 1102 that is pressed against and into the flash frozen rodent to produce an array of holes 501 into the rodent. The number of needles 1101 in the array 1100, the width of the needles 1102 and the spacing 1104 of the needles is selected on the type and size of feedstock animal to be dehydrated. In the preferred embodiment the width 1103 of the needles is 1/16" and the needles are spaced 1/4" apart 1104 and the piercing depth is 1/4".

Figure 12:
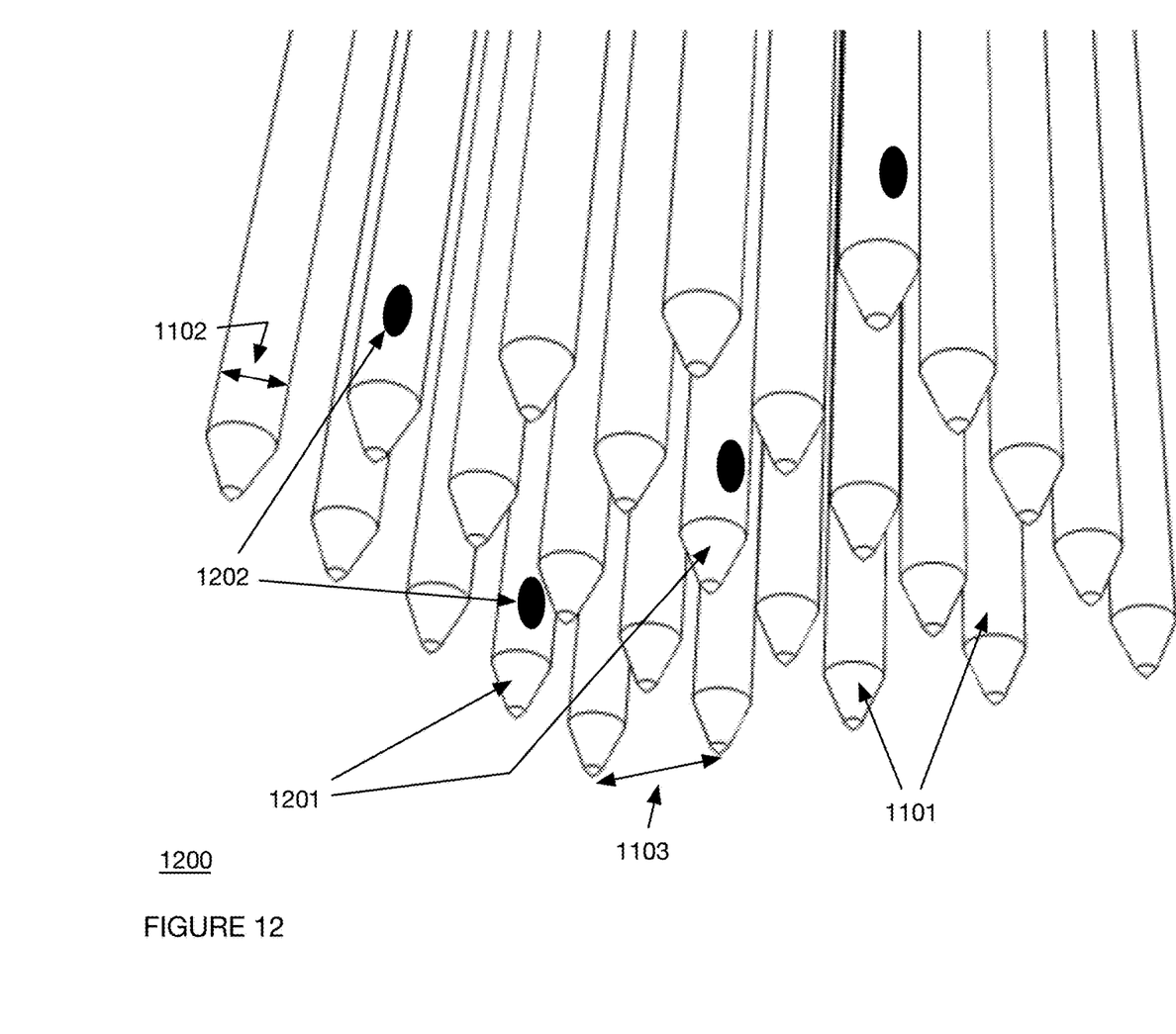
FIG. 12 shows an optional version of the device of FIG. 11 that enable injection of liquids at time of perforation.

In another version shown in FIG. 12 the needle array 1200 further includes at least one needle 1201 that is a hollow tube with a side port 1202 such as a hypodermic needle that delivers a liquid into the feedstock animal in the perforation step 803. Non-limiting example liquids includes preservatives, vitamin or other nutritive solutions, flavor enhancers and flavoring.

SUMMARY

Process steps including control means and devices for producing freeze dried whole animal pet food are described. The process includes use of a perforating device to produce an array of circular holes with a particular configuration and a selected set of process steps and control parameters that produce the freeze dried whole animal. The freeze dried whole animal appears much the same as the original live animal(s), is safe to handle with no exposed viscera, is not discolored, and rehydrates quickly to 100% of the initial live animal weight.

I claim:

1. A process for producing a freeze dried whole animal pet food, the process comprising:
    a. euthanizing a whole animal to be used as the pet food,
    b. flash freezing the whole animal,
    c. perforating the whole animal with a grid array of holes produced from a grid array of needles producing a perforated whole animal,
    d. freeze drying the perforated whole animal under a vacuum for a first temperature and a first time,
    e. then continue freeze drying the perforated whole animal under the vacuum for a series of temperatures and times, the series of temperatures ranging from the first temperature to room temperature, all completed under the vacuum,
    f. wherein each of the steps b.-e. is completed under microprocessor control and each of the steps including control parameters and wherein the control parameters include a lyophilization curve and a photographic visual standard.

2. The process of claim 1 wherein the control parameters further include a rehydration curve.

3. The process of claim 1 wherein the perforating the whole animal further include simultaneous injection of a liquid by the grid array, the grid array including at least one hollow needle that includes a side port.

4. The process of claim 3 wherein the liquid is at least one selected from: preservatives, vitamin or other nutritive solutions, flavor enhancers and flavoring.

* * * * *